United States Patent [19]

Trindle

[11] Patent Number: 4,538,480

[45] Date of Patent: Sep. 3, 1985

[54] BICYCLE PEDAL AND SHOE

[76] Inventor: James J. Trindle, 35395 Beach Rd., Capistrano Beach, Calif. 92624

[21] Appl. No.: 510,426

[22] Filed: Jul. 1, 1983

[51] Int. Cl.³ .............................................. G05G 1/14
[52] U.S. Cl. ................................. 74/594.5; 74/594.6; 36/131; 24/697
[58] Field of Search .......................... 74/594.6, 594.5; 36/131; 24/599, 697, 698

[56] References Cited

U.S. PATENT DOCUMENTS

| 293,581 | 2/1884 | Kressley . |
| 550,409 | 11/1895 | Hanson . |
| 588,038 | 8/1897 | Tudor . |
| 598,325 | 2/1898 | McIntyre . |
| 614,856 | 11/1898 | Gerow . |
| 3,788,163 | 1/1974 | Gause et al. |
| 3,964,343 | 6/1976 | Lauterbach . |

FOREIGN PATENT DOCUMENTS

| 82229 | 6/1983 | European Pat. Off. ........... 74/594.6 |
| 2816189 | 8/1979 | Fed. Rep. of Germany ........ 36/131 |
| 3000015 | 7/1980 | Fed. Rep. of Germany ..... 74/594.6 |
| 967277 | 10/1950 | France . |
| 1039485 | 6/1953 | France . |
| 18310 | of 1898 | United Kingdom . |
| 20592 | of 1908 | United Kingdom ............... 74/594.6 |
| 16829 | of 1909 | United Kingdom . |

Primary Examiner—Kenneth J. Dorner
Attorney, Agent, or Firm—Knobbe, Martens, Olson & Bear

[57] ABSTRACT

To enable a cyclist to provide 360° of driving force on each bicycle pedal, the cyclist's shoe is formed with a pair of lugs that mate with receivers formed on a bicycle pedal. The shoe is connected and disconnected to the pedal by a simple edgewise movement, with the connection being arranged to maintain the shoe in driving relation with the pedal when pedaling force is applied. In an alternative construction, the male connecting lugs are formed on the pedal while the female receivers are formed on the shoe.

11 Claims, 9 Drawing Figures

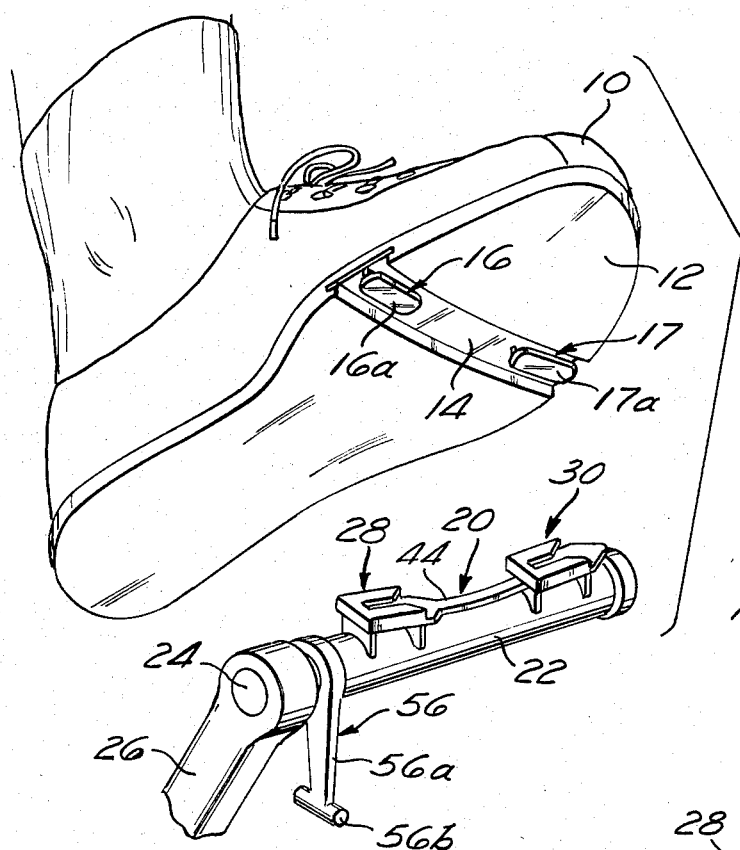
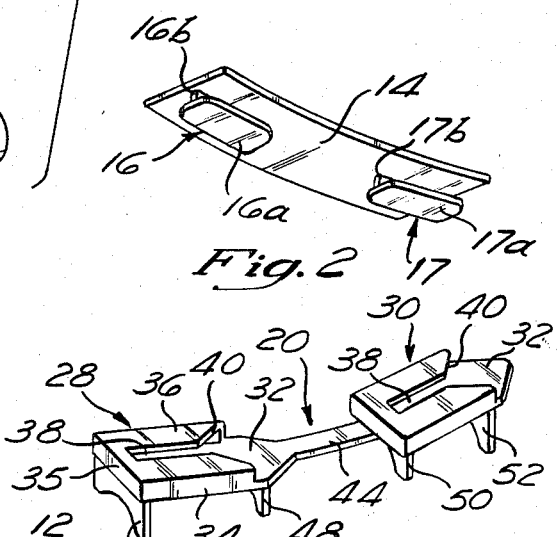
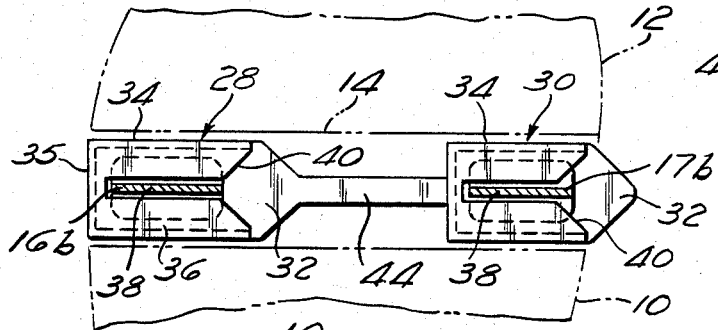
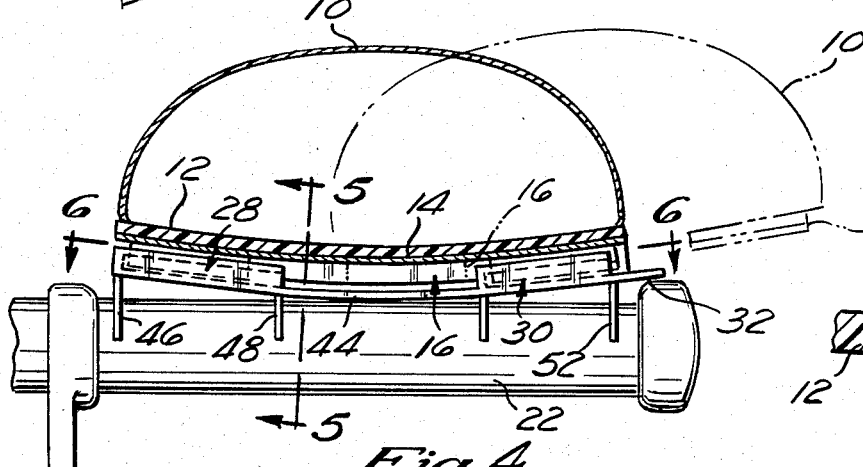
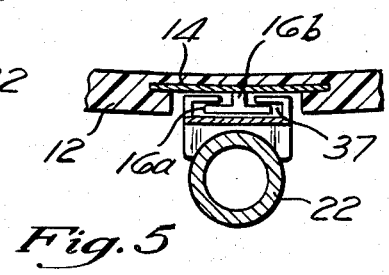

BICYCLE PEDAL AND SHOE

BACKGROUND OF THE INVENTION

This invention relates to an improved arrangement for connecting a bicycle shoe to a bicycle pedal.

When pedaling a bicycle in the normal manner with the rider's shoes not attached to the pedals, the pedaling force to rotate the bicycle drive wheel is only provided during about half the 360° movement of each pedal. That is, first one pedal is providing the basically downward thrust to rotate the pedal sprocket while the other pedal is moving upwardly without any driving force being provided, and then the situation is reversed as the other pedal is moved downwardly. These alternating forces by the opposite pedals are satisfactory for much bicycling activity. However, it is well known that it is much easier to propel a bicycle if each pedal is providing moving force throughout the 360° movement for each of the pedals.

Currently, bicycle racers and other bicycle enthusiasts utilize special racing shoes that attach to the pedals to enable this 360° force to be provided. The most common approach for accomplishing this is to utilize a toe clip and strap, preventing the shoe from being vertically lifted off of the pedal, and a groove block attached to the sole which prevents the shoe from sliding aft and out of the toe clip and strap. These shoes are frequently used for touring and racing long distances on motor highways.

A major disadvantage of this system is that the cyclist is released from the bicycle only by unbuckling the strap by hand. This is very inconvenient and awkward for routine stops such as at a traffic light. Consequently many cyclists attempt to keep moving slightly to avoid this, which is bothersome and many times dangerous. In case of a fall, collision with a motor vehicle, or other emergency, there is insufficient time for the cyclist to unbuckle his feet, with the result that the danger is greater and the cyclist remains strapped to the bicycle. This is why many cyclists wryly refer to their footwear as "suicide shoes".

A variety of other systems are known for connecting specially constructed bicycle shoes to specially constructed pedals to obtain the desired driving force during the 360° movement of each pedal. While some of these systems purport to provide easy connection and disconnection, they also typically include some additional means for maintaining the connection in a manner that requires the user's hands or requires some special movement of the user's feet which make connection-disconnection difficult. In any event, these alternative systems do not appear to be utilized in that the toe clip and strap approach referred to above remains in common use by racers and cycle enthusiasts.

Accordingly, a need exists for a shoe and pedal combination that improves the connection and disconnection system so that the connection is reliable during pedaling but is capable of instant disengagement without the use of hands. In addition, a combination meeting this requirement should preferably employ a shoe that is reasonably good for walking such that the cyclist does not have to carry an extra pair of shoes to be utilized when not riding the bicycle. This factor is quite significant for cyclists that tour considerable distances. For example, it is commonplace for many cyclists to ride 80 or 100 miles in a day. They buy expensive light weight, high performance bicycles to minimize the work required in pedaling the bike and thus not having to spend precious weight allowance on carrying an extra pair of walking shoes.

It is also important that the shoe and pedal combination be simple in design so as to be easy to utilize and to be reliable. Related to this, the construction must be rugged and durable to withstand the considerable stress to which the components are subjected over an extended period of time.

SUMMARY OF THE INVENTION

The present invention provides a bicycle pedal and shoe combination which satisfies the desired requirements. Briefly stated, the shoe is coupled to the pedal to provide the desired 360° pedal driving action in a manner such that the pedaling action produces forces to keep the shoe and pedal locked together, but when pedaling is interrupted the shoe many be disconnected from the pedal by simply moving the shoe a short distance in a natural manner. The connecting arrangement is slightly angled such that the normal pedaling action produces a lateral force component that tends to maintain the shoe in its proper pedaling position, but this retaining force stops when the pedaling action is stopped, such that the shoe may be readily disconnected from the pedal by simply moving the foot edgewise.

In a preferred arrangement, a pair of lugs are formed on a plate which is imbedded in the sole of a shoe, and a pair of channel-like receivers are formed on the pedal in position to receive the lugs upon lateral movement of the shoe. The shoe lugs are angled to define a slight convex curvature and the pedal receivers are mounted to provide a mating concave curvature with the result that the normal pedaling action produces a pair of lateral force components which cause the shoe to remain centered on the pedal. In an alternative arrangement, the pair of lugs is formed on the pedal and the receivers are formed on the shoe sole plate.

DETAILED DESCRIPTION OF THE PREFERRED EMBODIMENTS

FIG. 1 is a perspective view of the pedal and shoe combination of the invention with the shoe separated from the pedal.

FIG. 2 is a perspective view of the connecting lug plate which is imbedded in the sole of the shoe in FIG. 1.

FIG. 3 illustrates the lug receiver unit by itself which is mounted on the pedal of FIG. 1.

FIG. 4 is a side elevation view of the pedal with the shoe being shown in cross section while coupled to the pedal, the connecting and disconnecting movement of the shoe being illustrated by phantom lines.

FIG. 5 is a cross sectional view on line 5—5 of FIG. 4.

FIG. 6 is a cross sectional view on line 6—6 of FIG. 4 illustrating the shoe and pedal connecting means.

Figure 7:
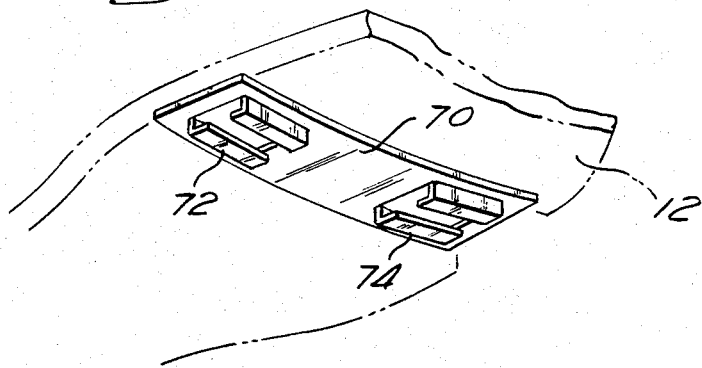
Figure 9:
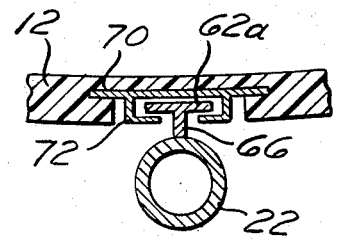
Figure 8:
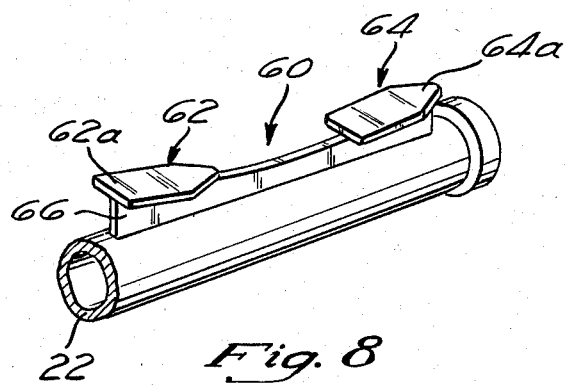

FIGS. 7, 8 and 9 disclose a second embodiment of the invention wherein the connector portions are reversed from that of FIG. 1, such that the male lugs are mounted on the pedal and the female connectors are mounted on the shoe plate.

Referring to FIG. 1, there is shown a shoe 10 having a sole 12 with a plate 14 extending transversely across the shoe sole in the area of the ball of a person's foot. The plate 14 is imbedded in a slot in the sole and secured to the sole in some suitable manner, such as with portions of the sole that overlapping the edges of the plate as seen in FIG. 5. Secured to the plate 14 is a pair of lugs 16 and 17 which are laterally spaced from each other, with one lug being positioned on one end of the plate adjacent one edge of the shoe sole and the other lug being positioned on the other end of the plate adjacent the other edge of the shoe sole. The lugs include generally horizontal portions 16a and 17a and vertical portions 16b and 17b that connect the horizontal portion to the plate 14. As seen in FIG. 5, this gives the lugs an inverted, generally T-shaped cross section. This positions the horizontal portions 16a and 17a spaced from and generally parallel to the plate 14.

For cooperating with the male connector lugs, there is provided a female connector unit 20 mounted on a pedal sleeve 22, which is rotationally mounted in conventional fashion on a pedal shaft 24 extending horizontally from a conventional pedal crank 26. The connector unit 20 includes a pair of channel-like lug receivers 28 and 30. Each of the receivers includes a bottom wall 32 and short upstanding side walls 34 and an end wall supporting a top wall 36, which together define a space 37 for receiving one of the connector lugs on the shoe. The ende of each receiver facing towards the outer lateral end of the pedal sleeve 22 is open to receive a connecting lug. Centrally located in the upper wall 36 of each of the receivers is a laterally extending slot 38 which opens into a V-shaped guide portion 40 which, in turn, is open to the outer lateral end of the receiver.

As may be seen, the receiver elements 28 and 30 are laterally aligned and spaced. This is conveniently accomplished by having the bottom wall 32 of the receivers 28 and 30 conveniently interconnected by a bridge 44. The receivers need not be connected to each other at all since they are both mounted on the pedal sleeve 22, but it is convenient to have them joined for maintaining proper alignment and spacing. Further, the bottom walls could be formed as a single plate similar to the plate 14, but it is desirable to reduce the amount of material in the area of the bridge 44 simply for the purpose of minimizing weight. Also, the portions of the bottom wall forming the entryway to the receivers 28 and 30 have somewhat pointed, tapered configurations designed to provide adequate guiding surface for the lugs 16 and 17 but at the same time minimizing the weight involved.

The receiver 28 is attached to the sleeve 22 by means of a pair of spaced supports 46 and 48, and the receiver 30 is similarly supported by supports 50 and 52. The upper edges of these supports are flat to conform to the bottom wall 32 of the receivers while the lower edges are curved to conform to the exterior of the sleeve 22. These lower edges are welded or otherwise suitably secured to the sleeve.

In accordance with the invention, the legs 46 and 52, which are closest to the ends of the sleeve 22, are taller than the inner legs 48 and 50, as may be most easily seen in FIG. 4. This causes the bottom walls of the receiver to be angularly oriented with respect to the sleeve 22. Further, the combination of the angle of the two receivers, essentially defines a slight curve, that is, a curve around a large radius, as may be seen in FIG. 4. In that view, the pedal sleeve 22 is horizontally oriented while the receivers define a concave upwardly facing curve, with the lowest point of the curve being in the bridge 44 between the two receivers. It may also be seen from FIG. 4 that the plate 14 forms a convex curve similar to that formed by the receivers with the result that the lug portions 16a and 17b essentially define a similar convex curve that mates with the receiver curve.

From the foregoing, it is can be seen that when the shoe 10 is to be connected to the pedal, it is placed as shown in broken lines in FIG. 4 with the lug 16 being positioned between the two receivers and aligned with the entry to the receiver 28 while the lug 17 is positioned laterally outwardly from but aligned with the receiver 30. The shoe is then moved edgewise to the solid line position shown in FIGS. 4 and 6 wherein the lug portion 16a is confined within the receiver 28 while its support portion 16b extends through the slot 38 in the receiver 28, while the lug 17 similarly cooperates with the receiver 30. The guide portions 40 help guide the lugs into the receivers. The end wall 35 of each receiver limits the lateral movement of the shoe, although it is not critical in that the cyclist's foot movement is limited in that direction anyway by the bicycle frame.

In this connected position, the cyclist can produce the desired 360° of pedal action.

If the user wants to disconnect his shoe from the pedal, it is of course only necessary to reverse the action by moving his foot edgewise outwardly to the broken line position shown in FIG. 4 and then lifting his foot. This action can be readily and quickly performed, which is of great significance from a standpoint of convenience and safety so that the user can stop the bike and easily place his feet on the ground or street, and can also separate from the bike easily in the event of an emergency.

While the precise movement of the user's foot and shoe in disconnecting the shoe from the pedal is movement on a wide arc followed by lifting, the general movement is edgewise or lateral outwardly. Conversely, in connecting the shoe to the pedal, the foot is moved essentially edgewise inwardly after the lugs have been aligned with the open ends of the receivers.

The significance of having the receivers angled or oriented on a wide, concave curve and the lugs angeled or oriented on a mating convex curve is that the users normal pedaling action will produce forces tending to keep the shoe properly centered and in driving relation with the pedal. That is, a downward force on the pedal produces primarily a vertical downward load, but in addition, the lug 17a in reacting against the receiver 30 produces a generally edgewise force component towards the lengthwise centerline of the shoe, while the lug 16a cooperating with the receiver 28 produces an edgewise force component on the shoe in the opposite direction, towards the lengthwise centerline of the shoe.

Similarly, when the cyclist's foot and shoe are providing a lifting force on the pedal, there are counterbalancing outward edgewise forces exerted on the pedal and the shoe which tend to maintain the shoe centered in the driving position. This is in contrast to a conventional flat, horizontal arrangement, wherein a shoe could inadvertently slip edgewise and become uncoupled from the pedal. Of course, by ceasing to apply torque to the pedals, the shoe may be instantly disengaged by the slight sideways or lateral movement.

Another advantage of the arrangement illustrated is that the lugs 16 and 17 on the shoe are relatively inobstrusive, being approximately flush with the bottom of the shoe sole. Consequently, the cyclist can walk with relative ease with these shoes, thus not having to hop or hobble and avoiding the necessity to carry an extra pair of shoes to be used when not on the cycle.

From the foregoing it will be noted that it is necessary that the receivers 28 and 30 be facing upwardly as shown in FIGS. 1 and 4, when the shoe is to be connected to the pedal. To make sure that the pedal, when free, will always take this orientation, there is provided a counterweight 56 attached to the inner end of the spool 22. The counterweight has a relatively long moment arm 56a such that only a relatively small weight 56b is required to provide sufficient torque to cause the sleeve to always rotate to the position wherein the weight 56b is hanging downwardly, while the receivers 28 and 30 are always facing upwardly.

FIGS. 7, 8 and 9 illustrate an alternative arrangement which is essentially the reverse of that shown in FIGS. 1-6. That is, the support plate 70 that is imbedded in the sole 12 of the shoe is provided with a pair of channel-shaped receivers 72 and 74, as shown in FIG. 7, while the sleeve 22 on the pedal is provided with a pair of lugs 62 and 64. These lugs include generally horizontal portions 62a and 64a that fit within the channel-shaped receivers 72 and 74 with the support legs 66 supporting the lug portion 62a and 64a extending through the slots in the receivers. The channels 72 and 74 are not provided with end walls, to illustrate that they are not mandatory. The sole plate 70 and the lug portions 62a and 64b are oriented to form the mating convex and concave curves referred to above so that the shoe will tend to remain centered in the driving position with the pedal during normal pedaling action. The connecting and disconnecting movement is, of course, the same for the arrangement of FIGS. 7, 8 and 9 as it is for the embodiment of FIGS. 1-6.

I claim:

1. The combination of a bicycle pedal, a shoe, and connector means formed on the pedal and the shoe for releasably connecting the shoe to the pedal in a manner to enable rotational force to be applied through the shoe to the pedal through 360° of rotation, said connector means including interengaging connectors arranged such that the shoe may be connected to and disconnected from the pedal simply by moving the shoe relative to the pedal wherein the connector means on the pedal are arranged so that the connectors define a concave curve on the surface of the pedal facing outwardly from the pedal's rotational axis, said curve being in the plane defined by the center of curve and the pedal's rotational axis, and the connector means on the shoe are arranged to define an outwardly facing convex curve which mates with the concave connector means on the pedal so that the normal bike pedaling action produces lateral force components tending to maintain the shoe centrally on the pedal throughout the entire 360° rotation of the pedal.

2. The combination of claim 1 wherein the connectors include means that are connected and disconnected by substantially sideways movement of the shoes in a direction substantially parallel to the rotational axis of the pedal.

3. The combination of claim 1 wherein said connectors includes a plate imbedded in the sole of said shoe with a connector mounted on said plate, and said connector means further includes a connector mounted on said pedal to mate with the connector on the shoe.

4. The combination of claim 1 wherein said pedal includes a sleeve rotatably mounted on a shaft, and said connectors includes a pair of laterally-spaced connectors on said sleeve, and further including a counter weight attached to said sleeve and extending radially outwardly from the sleeve on a side opposite to that of the connectors on said sleeve so that when the shoe is not connected to the pedal, the sleeve will rotate, urged by said counterweight, to the position where the counterweight exceeds downwardly and the connectors on the sleeve extend upwardly for ready connection to the shoe.

5. The combination of claim 1 wherein said connectors include a connector on said shoe and a connector on said pedal with one of said connectors being laterally received in the other and one of said connectors including guide means for guiding the connectors into interengaging position.

6. The combination of claim 1 wherein said connectors include a pair of lugs laterally spaced and secured to the sole of said shoe and said pedal includes a pair of laterally-spaced female connectors for receiving said lugs.

7. The combination of claim 1 wherein said connectors includes a pair of lugs laterally spaced and secured to said pedal, and a pair of laterally-spaced female connectors mounted on the sole of the shoe for receiving the lugs.

8. The combination of claim 1, wherein said connectors include a pair of laterally spaced male connectors on the shoe and a pair of laterally spaced female connectors on the pedal to laterally mate with the male connectors.

9. The combination of claim 1, wherein said connectors include a pair of laterally spaced male connectors on the pedal and a pair of laterally spaced female connectors on the shoe to laterally mate with the male connectors.

10. The combination of a bicycle pedal including a sleeve rotatably mounted on a shaft, a pair of connectors laterally spaced on said sleeve, said connectors being oriented to define a substantially concave arc facing outwardly from the pedal's rotational axis, with the midpoint of the arc being between said connectors, said arc being in the plane defined by the center of the arc and the pedal's rotational axis, a shoe having a reinforcing support plate imbedded in the sole of the shoe, a pair of laterally-spaced connectors secured to and extending downwardly from said plate, the connectors on the shoe being sized to move laterally into engagement with the connectors on the pedal in a manner to enable a rotational force to be applied through said shoe to said pedal through 360° of pedaling rotation, the connectors on said shoe being oriented to define a convex arc such that normal pedaling action on the pedal produces lateral forces urging said shoe to remain centered on the pedal with the connectors interengaged.

11. A method of making a releasably interengaging connection between a bicycle pedal and a shoe to be worn by the person pedaling the bicycle comprising mounting connector means on the pedal and on the sole of the shoe that can be releasably connected and disconnected by substantially sideways movement of the shoe in a direction substantially parallel to the rotational axis of the pedal wherein the connector means mounted on the pedal define a concave curve facing outwardly from the pedal's rotational axis, said curve being in the plane defined by the center of the curve and the pedal's rotational axis, and the connectors on the shoe are mounted to form an outwardly facing, convex curve which mates with the pedal curve such that normal pedaling action creates lateral forces tending to center laterally the shoe on the pedal.

* * * * *